June 9, 1942. A. G. FELDMAN 2,285,700
BABY CARRIAGE
Filed Aug. 20, 1940 3 Sheets-Sheet 2

Inventor:
Abraham G. Feldman
By McCaleb & Wendt
Attys.

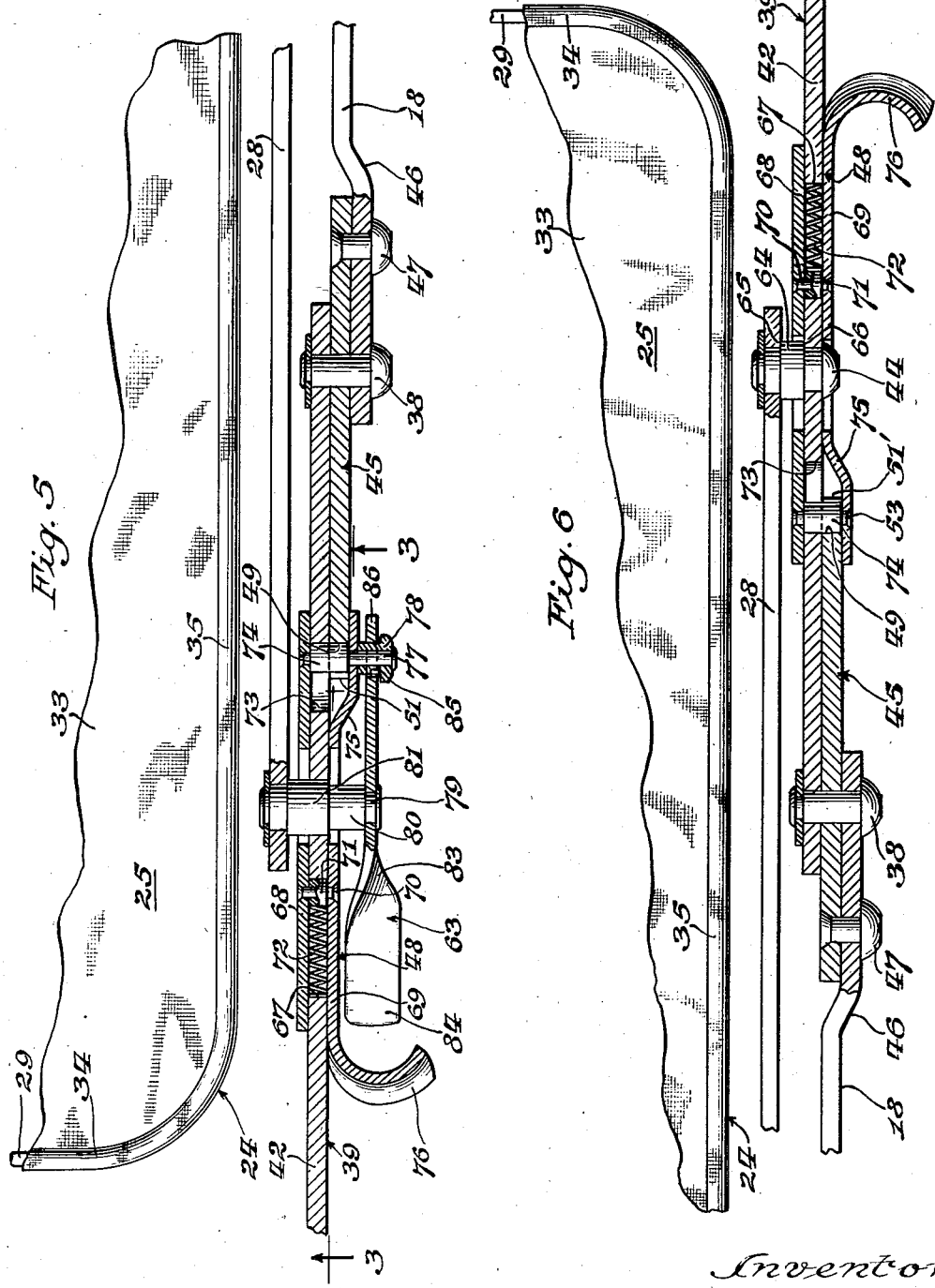

Patented June 9, 1942

2,285,700

UNITED STATES PATENT OFFICE 2,285,700

BABY CARRIAGE

Abraham G. Feldman, Chicago, Ill., assignor to Storkline Furniture Corporation, Chicago, Ill., a corporation of Illinois Application August 20, 1940, Serial No. 353,393

2 Claims. (Cl. 280—36)

The present invention relates to baby carriages, and is particularly concerned with baby carriages of the collapsible type.

One of the objects of the invention is the provision of an improved collapsible mechanism for baby carriages, which has its handle provided with means for effecting an adjustment of the elevation and/or angle of the handle to suit the convenience of persons of different stature.

Another object of the invention is the provision of an improved baby carriage of the collapsible type, which is provided with latching means for securing the collapsible mechanism in extended position, and which has its handle so arranged that it may be disposed at any of a number of different elevations.

In the baby carriages of the prior art the handles have been arranged at an elevation which is suitable for the average user, but baby carriages are propelled by all of the different members of the household, and a handle which has its elevation at a convenient point for adults is too high for convenient operation by a child, and vice versa.

In the same way a handle at the best elevation for operation by the mother of the infant would be too low to suit the convenience of the father, as men are customarily of greater stature than women, although the reverse may also be true.

All of these situations are taken care of according to the present invention by providing a handle which may be adjusted to a plurality of different elevations, the lowest of which is suitable for use by children, and the highest of which is best adapted for a very tall person.

Another object of the invention is the provision of an improved safety latch for the collapsible mechanism, by means of which every possibility of unlatching of the mechanism and collapse of the carriage is precluded, except when intentionally collapsed by the operator.

Other objects and advantages of the invention will be apparent from the following description and the accompanying drawings, in which similar characters of reference indicate similar parts throughout the several views.

Referring to the three sheets of drawings accompanying the specification:

Fig. 5 is a fragmentary sectional view, taken on the plane of the line 5—5 of Fig. 2, looking in the direction of the arrows;

Fig. 6 is a fragmentary sectional view, taken on the plane of the line 6—6 of Fig. 4, looking in the direction of the arrows.

Figure 1:
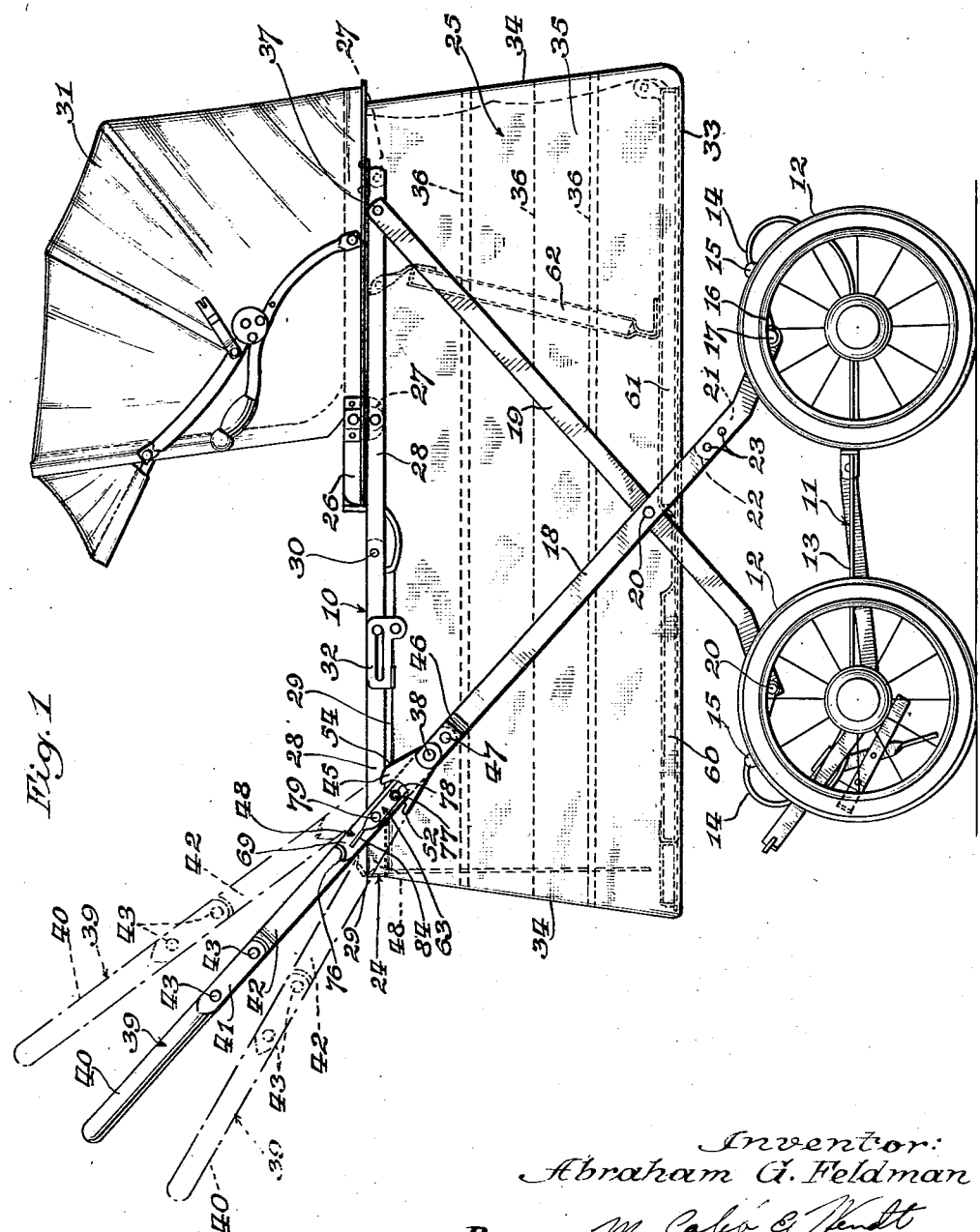
Fig. 1 is a side elevational view of a baby carriage embodying my invention, in which various additional positions of the handle are shown in dotted lines.
Figure 2:
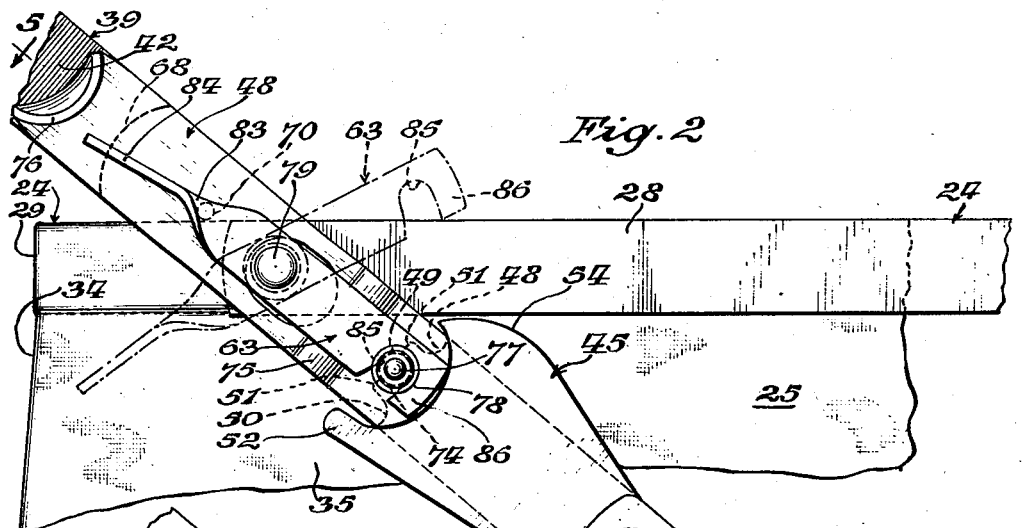
Fig. 2 is a full size fragmentary elevational view of the latching mechanism and means for adjustment of the handle.
Figure 3:
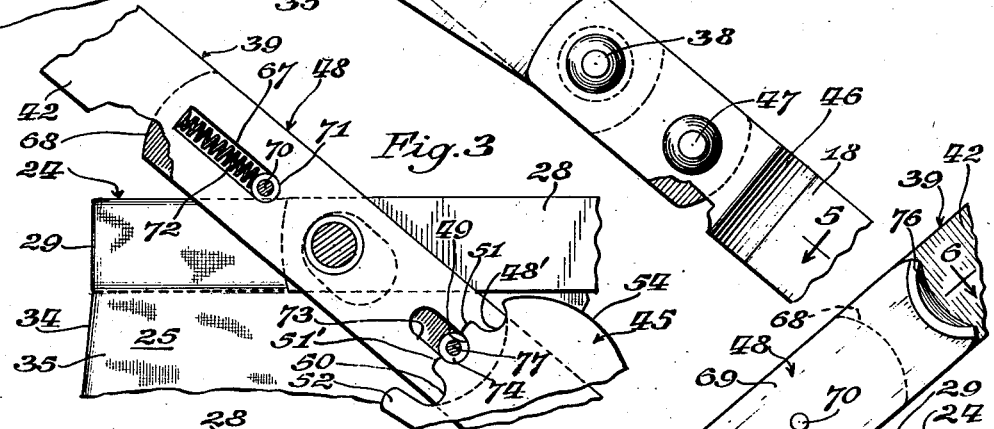
Fig. 3 is a sectional view, taken on the plane of the line 3—3 of Fig. 5, looking in the direction of the arrows, showing the details of construction.

Referring to Fig. 1, 10 indicates in its entirety a baby carriage constructed according to the invention. This carriage may include a collapsible mechanism which is carried by a chassis, indicated at 11. The chassis 11 comprises a pair of wheel shafts, not shown, each shaft supporting at its ends a pair of similar wheels 12, and the shafts are fixedly secured to a pair of longitudinal frame members 13.

These longitudinal frame members have upwardly and inwardly curved ends 14, provided with curved cylindrical portions, forming bearings for a pin 15, which secures the spring ends 14 to a shackle 16. The shackles are pivotally secured by a pin 17 to the lower ends of the scissor bars 18, 19, which are pivotally secured together by a rivet at 20.

Both sides of the collapsible frame may be similar in construction, except as to the structure of the latch, and therefore the other side of the carriage would also be provided with a pair of scissor bars 18, 19 pivotally secured to shackles 16 carried by the springs 13 at their ends 14.

The two similar scissor bars 18 may be fixedly secured together by a transverse frame member 21, which has an attaching flange 22 at right angles, secured to the lower part of the scissor bar 18 by rivets 23. This causes the scissor bars 18 on both sides of the carriage to move together.

The scissor bars 18, 19 at the two sides of the carriage support an upper framework 24 for the flexible basket 25. This upper framework may consist of a substantially U-shaped metal frame member 26 of angle iron, having a vertical flange, and an outwardly extending horizontal flange of the U-shaped member 26 which is secured by brackets 27 to a longitudinally extending metal strap 28.

The strap 28 is pivotally secured to a U-shaped metal strap member 29, which provides a support for the left end of the basket and a pivotal point of support of this U-shaped member 29 is at 30 on each side of the upper frame. A suitable top 31 may be supported by means of a frame, as shown, upon the U-shaped frame member 26, the vertical flange of which it embraces when it is in the position of Fig. 1, and the left end of the basket, including the frame member 29, may be held in elevated or lowered position by means of a latching member 32.

The basket 25 may comprise a bottom 33, two end walls 34, and two side walls 35, all joined together, and each consisting of a pair of layers of fabric, such as imitation leather, with the finished side exposed on the outside and the inside of the basket.

Suitable layers of padding may be disposed between these two layers of fabric and secured in place by lines of stitching 36, after the manner of quilting, to retain the padding in proper place and protect the occupant from engagement with the scissor bars or other parts of the foldable metal mechanism.

The basket 25 may be supported on the framework 24 by having the upper edges formed into a loop of fabric. This loop of fabric at the left end of the carriage may extend about the U-shaped metal member 29 by which it is supported. At the right end of the carriage, in Fig. 1, the loop in the fabric of the basket may extend about an auxiliary U-shaped metal strap, which is riveted to the vertical flange of the U-shaped frame member 26, for support of the basket at this end.

The bottom of the basket 25 is preferably provided with a plurality of fabric covered plywood panels 60, 61 and a similar fabric covered plywood panel 62 may be secured in position, shown in Fig. 1, for use as a back rest by means of straps and snap fasteners.

The upper ends of the scissor bars 19 are secured to the upper frame members 28 by means of a rivet 37, permitting pivotal engagement between the scissor bar 19 and the member 28. The upper ends of the scissor bars 18 are pivotally secured at 38 by means of the rivet 38 to the lower end of a U-shaped handle 39.

The handle 39 may consist of a tubular metal member 40, which is bent to substantially U shape, to provide a pair of legs for engagement with the upper ends of each of the scissor bars 18. These legs of the tubular member 40 are flattened at 41 on each side of the handle, in order that they may be secured to a flat metal strap 42 by means of pairs of rivets 43, in such manner that the strap 42 forms an extension of the tubular handle 40.

It is the strap 42 which is pivotally secured to the scissor bars 18 at each side by means of the rivet 38. These two straps 42 at each side of the carriage form a part of the handle legs, and are also pivotally secured to the metal frame member 28 by means of a rivet 44, so that an upward pivotal movement of the handle 39 causes the pivotal point 38 to be drawn toward the left and causes the scissor mechanism to collapse, the handle passing over toward the right above the carriage frame 24.

In order to provide for the securement of the handle in a number of different positions, the scissors bars 18 at each side of the carriage are provided with what may be termed a gear segment extention 45.

This gear segment extension 45 might be an integral part of the scissor bar 18; but, as it is made of wider stock, the scissor bar 18 is offset outwardly at 46, and the gear segment 45 preferably provides a separate metal member, which is secured to the scissor bar 18 in each case by a pair of rivets 38 and 47.

The two handle legs 42 are preferably provided with slidably mounted latching members 48, one on each side, for engagement with the teeth of the gear segment 45, in order to latch the carriage in open position or to latch the handle in any of a plurality of positions.

The structure of these sliding latches is better illustrated in Figs. 2 to 6, to which reference will be made for description of the structure.

Figure 4:
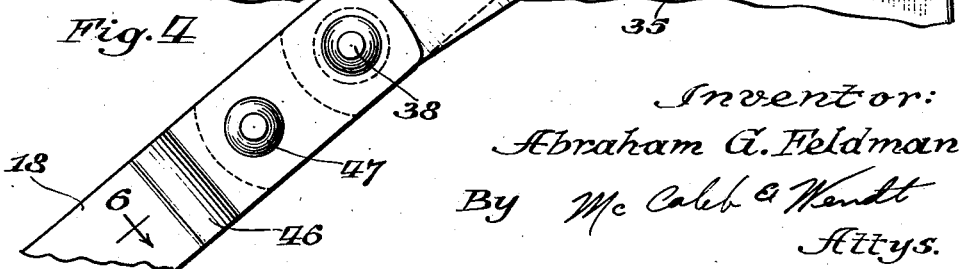
Fig. 4 is a fragmentary full size side elevational view, similar to Fig. 2, but taken at the opposite side of the carriage.

The gear segment 45, carried by each of the scissor bars 18 at each side of the carriage, is shown in full size in Fig. 4, and it comprises a sheet metal member which is formed at its end with a plurality of half cylindrical grooves 48', 49, 50. These grooves are separated by the teeth 51 and 51', the width of the teeth depending upon the spacing desired in the grooves, and the spacing of the grooves depending upon the positions desired for the handle.

The last or lowermost of these grooves 50 is bounded on the lower side by an elongated tooth 52, which serves as a stop beyond which the latching pin 53 cannot pass, thus defining the lowermost position of the handle 39.

The gear segment 45 or keeper 45 for the latch 53 is preferably formed on its upper side with a curved camming surface 54 of such shape that it is adapted to cam the latching pin 53 toward the right in Fig. 4, when the folding mechanism of the carriage is opened.

Thus the latching mechanism is self-latching upon opening of the collapsible mechanism to the first position, with the pin 53 in the groove 48'.

The sliding latches 48 may be of similar construction on both of the legs 42 of the handle 39, except that one of these latches is preferably provided with a safety catch 63.

The sliding latch 48, without the safety catch at the left side of the vehicle, is shown in Figs. 4 and 6. At this side of the carriage the leg 42 of the handle 39 is pivotally secured to the scissor bar 18 by the rivet 44. This rivet 44 may have an enlarged intermediate portion 64, with annular shoulders 65 and 66, which are used for securing the rivet to the scissor bar 18 and handle strap 42.

The handle strap 42 is provided with an elongated aperture 67, and the latch 48 comprises a pair of metal plates 68 and 69, one mounted on each side of the handle strap 42. These plates 68, 69 are secured together by a transverse rivet 70 passing through each of the plates and riveted over and passing through the elongated slot 67.

The rivet 70 may carry a block 71 inside the slot 67 engaging the compression coil spring 72, which urges the latching member toward the left in Fig. 6, the other end of the spring engaging the end of the slot 67. The spring 72 is thus housed in the slot 67 by means of the plates 68, 69, and it urges the latching mechanism 48 into the latching position.

At the other side of the rivet 44 the leg 42 of the handle is provided with another elongated slot 73 for passing a rivet 53 and its spacer 74. The rivet 53 also secures together the left end of the plates 68, 69 in Fig. 6.

The spacing member 74 may comprise a cylindrical member having an aperture for passing the rivet 53, which serves as a latching pin. The spacer 74 also serves as a roller for facilitating the sliding motion of the latching pin 53 over the cam 54 into the grooves 48', 49 or 50.

As the left end of the plates 68, 69 in Fig. 6 embraces both the gear sector 45 and the handle leg 42, the outer plate 69 is offset at 75 so as to space its ends sufficiently at the rivet 53 to receive both the members 48 and 45.

The length of the slots 73 and 67 is such that the roller 74 and pin 53 may be withdrawn from the grooves 48' to 50 by a pull on a curved thumb piece 76. When the thumb piece 76 is released, the spring urges the latching mechanism 48 into latching engagement or toward the left in Fig. 6.

Referring to Fig. 5, the structure of this right hand latching member may be substantially similar to that previously described, except that the rivet 77, which corresponds to the rivet 53 on the other side, is elongated sufficiently to support a headed sleeve 78.

The rivet 79, which corresponds to the rivet 44 on the other side of the carriage is also elongated and provided with spacer members 80 and 81, in order that rivet 79 may be supported at its outer end above the safety latch 63. This safety latch 82 comprises a strap of metal which is twisted at the point 83 to provide a handle 84, which extends transversely to the direction of movement, and which may be more conveniently engaged by the fingers.

At its opposite end the safety latch 63 has a slot 85 extending laterally into its body and forming a hook 86. The hook 86 is so located as to engage about the headed sleeve 78, which is carried by the rivet 77 of the sliding latching mechanism 49. The slot 85 is of a size to receive the sleeve 78. Thus, when the safety latch 63 is in the full line position of Fig. 2, the sliding latch 48 cannot be withdrawn because it is held with its pin 53 in one of the grooves 48' to 50 by the walls of the slot 85 of the safety latch 63. The safety latch 82 must be moved to the dotted line position of Fig. 2 before the latching mechanism on the right hand side of the carriage can be unlatched.

The operation of the latching mechanism will be apparent from the description of its parts. The proportions of the parts and their attachment to the chassis springs are such that when the folding mechanism, comprising scissor bars 18, 19, is opened, it places a predetermined tension upon the chassis springs 13. The shackles 16 are lifted to substantially horizontal position, and the curved ends 14 of the springs are drawn inward toward each other. Thus there is a tendency of the carriage, both by virtue of the spring tension and by virtue of the weight of the upper part of the collapsible mechanism and basket, to collapse; but this is resisted by the latching mechanism.

The carriage is opened by grasping the handle 39 with both hands approximately at the flattened portions 41, and bearing down with the elbows on the transverse or yoke portion of the tubular handle member 40. When the pin 53 engages the camming surface 54, the latches 48 are cammed backward against the springs 72 until the pin 53 rides over into the notch 48'. This is the highest position of the handle and the lower positions may be used by pulling both of the latches 48 at the thumb piece 76, and continuing the downward movement of the handle by means of the hands and elbows applied as described.

Thus, the handle may be placed in any of three different positions, and I desire it to be understood that any number of different handle adjustments or grooves in the gear sector may be used. The present mechanism is absolutely safe because of the safety latch, which positively prevents any unlatching of the latches, except by intent of the operator, and the present carriage is adapted to be adjusted to suit the convenience of persons of various stature. This is of the utmost importance because it is customary to lift the handle when raising the rear wheels or to depress the handle when raising the front wheels, and this can only be done with difficulty when the handle is too high or too low for the operator. It is only when the handle is adjusted to the height of the operator that the operator of the vehicle can drive it with ease and lift either the front or the back wheels to rise over obstructions or curbs, with the greatest of ease.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A latching mechanism for the collapsible framework of baby carriages, comprising a foldable framework including a handle having a pair of legs, a basket-supporting frame having its opposite sides pivotally secured to said handle legs below said basket, one of said legs being provided with a slider slidably mounted on said leg, said slider having a transversely extending latching element located in a slot in said leg, and a keeper carried by and forming an extension of one of said folding frame members and projecting toward said latching element, said keeper being formed with a plurality of recesses on the side toward said latching element, said recesses being separated by oppositely disposed latching shoulders, whereby said latching element may be secured in any one of said plurality of recesses to support the handle at any of a plurality of different elevations when the baby carriage has its folding framework extended, said keeper being formed on one side with a stop extension for preventing movement of said latching element beyond said extension, and said keeper being formed on its opposite side with a camming surface for camming said latching element upward when the framework is unfolded, said latching element being spring pressed whereby it automatically moves into the first latching position.

2. A latching mechanism for the collapsible framework of baby carriages, comprising a foldable framework including a handle having a pair of legs, a basket-supporting frame having its opposite sides pivotally secured to said handle legs below said basket, one of said legs being provided with a slider slidably mounted on said leg, said slider having a transversely extending latching element located in a slot in said leg, and a keeper carried by and forming an extension of one of said folding frame members and projecting toward said latching element, said keeper being formed with a plurality of recesses on the side toward said latching element, said recesses being separated by oppositely disposed latching shoulders, whereby said latching element may be secured in any one of said plurality of recesses to support the handle at any of a plurality of different elevations when the baby carriage has its folding framework extended, and a safety latching element comprising a pivoted lever pivotally mounted on a handle leg and the basket-supporting frame at the point of pivotal connection between said handle leg and frame, said lever having a pair of shoulders for engaging said latching element on said slider to hold the slider against inadvertent longitudinal movement on said leg.

ABRAHAM G. FELDMAN.